Aug. 18, 1931.   R. N. HEALD   1,819,094
GRINDING MACHINE
Filed May 31, 1928   4 Sheets-Sheet 1
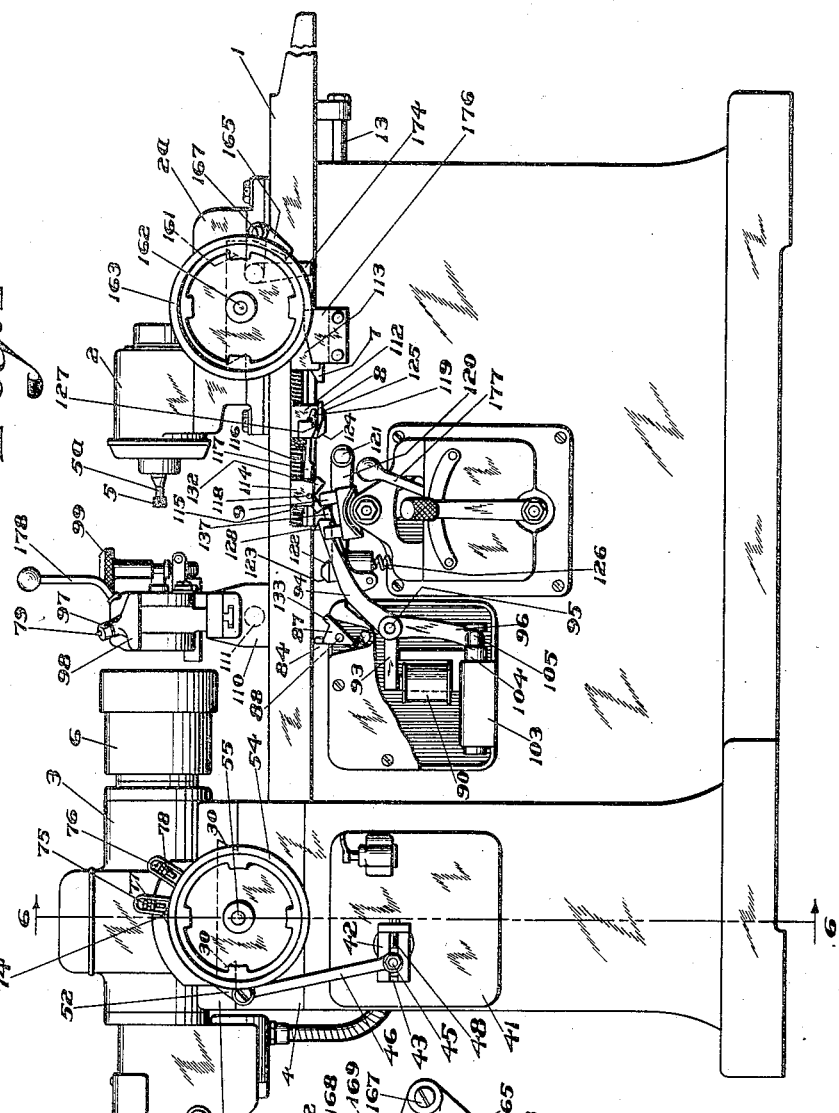
Inventor
Roger N. Heald
By Geo. H. Kennedy Jr.
Attorney Inventor
Roger N. Heald
By Geo. H. Kennedy Jr.
Attorney Aug. 18, 1931.   R. N. HEALD   1,819,094
GRINDING MACHINE
Filed May 31, 1928   4 Sheets-Sheet 4

Inventor
Roger N. Heald
By Geo. H. Kennedy Jr.
Attorney

Patented Aug. 18, 1931

1,819,094

UNITED STATES PATENT OFFICE

ROGER N. HEALD, OF WORCESTER, MASSACHUSETTS, ASSIGNOR TO THE HEALD MACHINE COMPANY, OF WORCESTER, MASSACHUSETTS, A CORPORATION OF MASSACHUSETTS

GRINDING MACHINE

Application filed May 31, 1928. Serial No. 281,898.

The invention relates to grinding machines particularly of the internal grinding type, and more specifically to the transverse feeding mechanism thereof by means of which the grinding wheel or workpiece is moved, one in cutting relation to the other. In the usual type of such mechanism the cross or transverse feed is obtained through intermittent rotation of a screw shaft, which consequently must be rotated in the reverse direction after the grinding of each workpiece, in order that the parts of the machine may be in position to grind the next succeeding workpiece. Such retraction of the feed screw shaft has usually been performed by hand, although there have been mechanisms designed to do this automatically, which mechanisms are necessarily somewhat complicated. According to the present invention, the cross-feed is produced by means of a rotatable cam, which never has to be moved in a retrograde direction, because the portion of the cam representing the utmost feed which it is possible to give is followed, on the cam contour, by the portion which determines the position of the parts at the start of a grinding operation. The attainment of the above is consequently one object of the invention.

In the use of the mechanism just described it is obvious that if the machine provided only such a cam with provision to stop the grinding operation substantially at the point where the cam had moved to the position of the utmost feed, the machine would be capable of grinding only one size of workpiece. This limitation being, naturally, an undesirable one, I have provided an additional cross-feed mechanism by means of which workpieces of any desired ultimate interior diameter can be ground. As illustrated in the accompanying drawings, the cross-feed actuated by the aforesaid rotatable cam is caused to move the work head transversely of the machine base, while the additional feed, that permits the adjustment of the machine for any size workpiece, is incorporated into a feed for the grinding head transversely of the reciprocatory table which in grinding machines of this class produces the relative traverse between wheel and work. It is obvious, however, that the arrangment of these mechanisms could be reversed.

Another feature of the invention consists in the provision of means to cause the rotatable cam to be actuated from the same source of power that rotates the chuck, which means does not have to be readjusted for each different traversing position of the grinding table, as is the case with cross-feeding mechanisms actuated by the table traverse.

The above and other advantageous features of the invention will hereinafter more fully appear from the following detailed description, taken in connection with the accompanying drawings, in which:—

Fig. 1 is a front elevation of a grinding machine constructed in accordance with the invention.

Fig. 2 is a fragmentary elevation of the actuating mechanism for the dressing or compensating feed, the hand wheel being removed.

Like reference characters refer to like parts throughout the drawings.

Figures 3, 5:
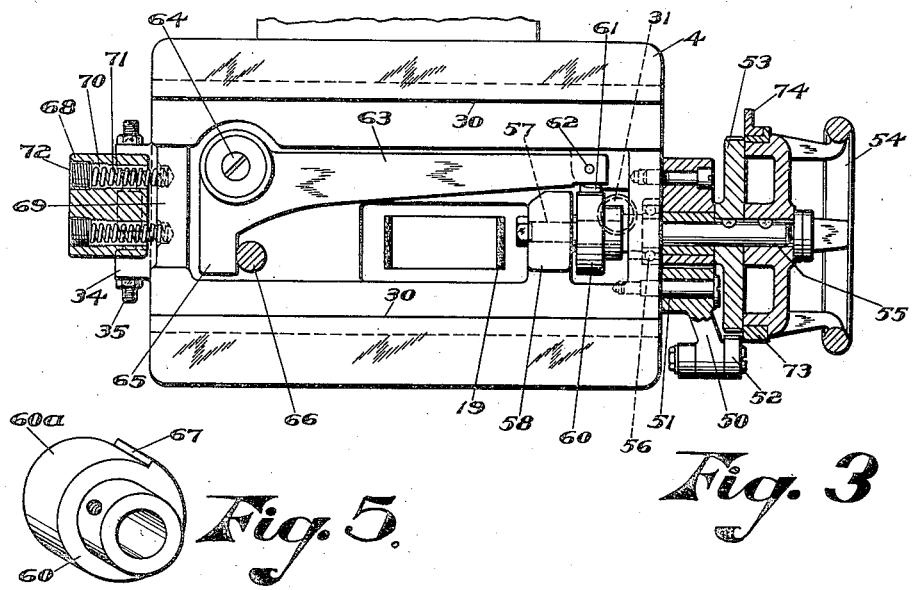
Fig. 3 is a plan view of the supporting ways for the work head, certain parts being shown in section.
Fig. 5 is a detached isometric view of the rotatable feed cam.

Referring particularly to Fig. 1, the machine provides the usual reciprocatory table or carriage 1, with which the ordinary type of internal grinding machine is equipped. In such a machine, either the grinding wheel or the work to be ground may be carried on the table 1, the reciprocations of the latter being utilized in either case to produce a relative traversing movement between the grinding wheel and the work.

As here shown the table 1 supports and carries a wheel head 2 of the usual construction;—while the work which is to be operated upon is held in a work head 3, the latter being carried by a bridge 4 which spans the slideways provided by the machine frame for the back and forth movement of the table 1.

Said back and forth movement of the table 1, to cause a rotating grinding wheel 5 to make the required interior traverse of the workpiece held in the rotating chuck 6, may be imparted in any well known manner, as for instance by the use of the fluid pressure controlling and reversing mechanism which forms the subject matter of U. S. Letters Patent No. 1,582,468 to Heald & Guild, granted April 27, 1926. Such mechanism, or its equivalent, forms no part of the present invention and a detailed description thereof is therefore unnecessary; but as an illustrative embodiment of such it is sufficient to note that the driving means employed for the reciprocation of the table 1, may produce the reversal of said table at each end of the latter's normal working stroke in response to the engagement of spaced adjustable dogs 7 and 8, carried by the table, with an interposed member 9. Although the driving means for the table 1 might be a gear drive or any other suitable type, I prefer to employ a hydraulic drive, and consequently the reversing member 9 is connected in a manner not necessary to be described herein, to a valve member 10, which is therefore oscillated, and which controls the admission of fluid, put under pressure by a pump 11, to first one side and then the other of a cylinder 12, containing the usual double acting piston whose piston rod 13, as clearly shown in Fig. 1, is connected to the table 1. For further details of a particular hydraulic means for actuating the reciprocating table, reference may be had to the aforesaid patent.

Figure 4:
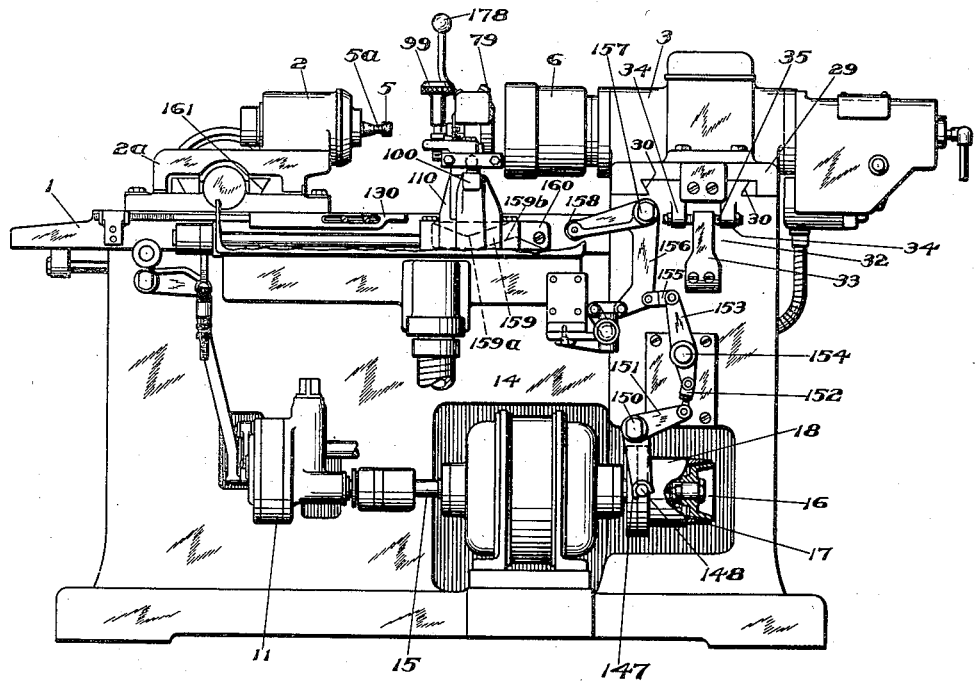
Fig. 4 is a rear elevation of the grinding machine.
Figure 6:
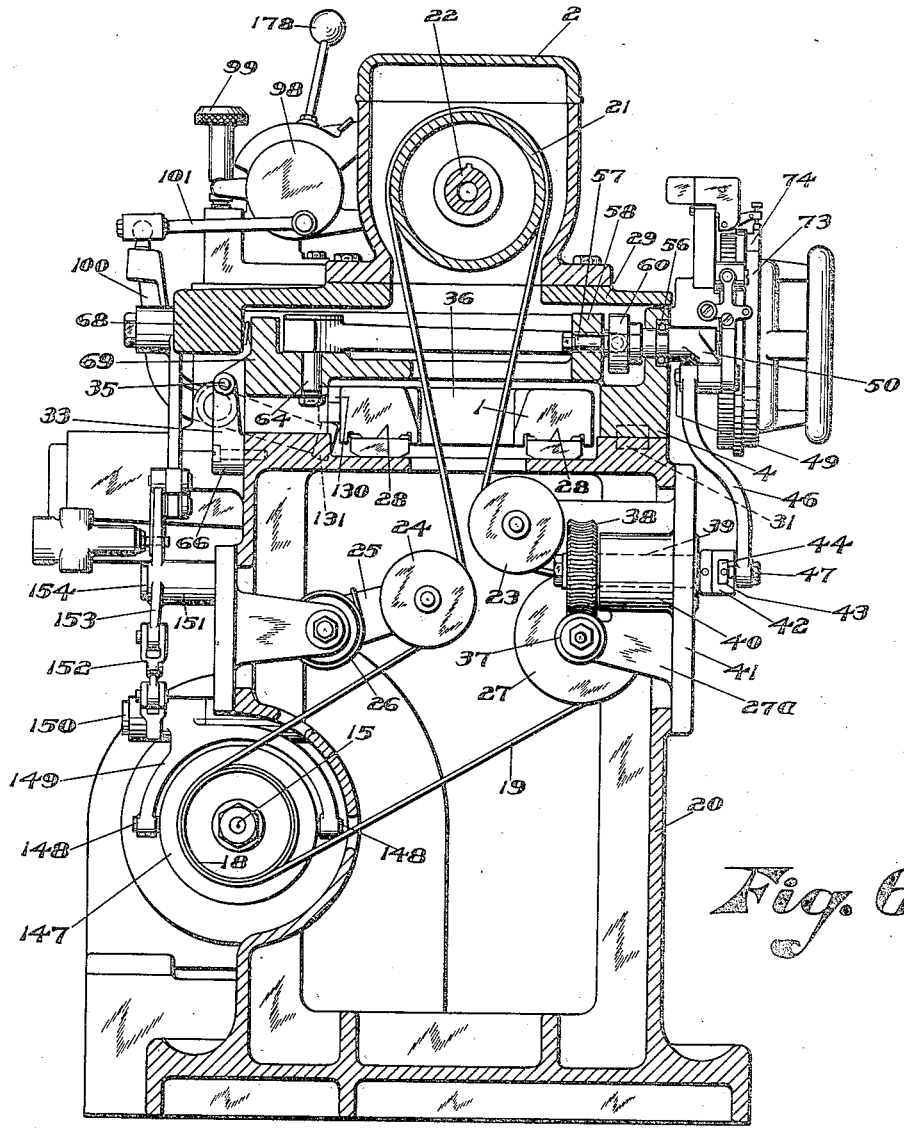
Fig. 6 is a transverse sectional view taken on the line 6—6 of Fig. 1.

As best shown in Fig. 4, the machine may be driven by an electric motor 14 to the drive shaft 15 of which is attached the driving element of a clutch 16. The other or driven element 17 of the clutch is formed integrally with a pulley 18 around which, as best shown in Fig. 6, the work driving belt 19 passes. The latter extends upwardly inside the hollow base 20 of the machine to a pulley 21 that is fastened to the chuck holding spindle 22, being guided and held under proper tension by a stationary idler pulley 23 and a tensioning idler pulley 24 that is mounted on a pivotal arm 25, and pressed against the belt by means of the usual spring 26. The belt 19 likewise passes around a pulley 27, the consequent rotation of which is utilized to effect the normal transverse feed between wheel and workpiece as will be hereinafter described.

The work head 3, in which the chuck spindle 22 is journaled, is not fastened directly to the bridge 4 that spans the slideways 28, 28, provided for the reciprocatory travel of the table 1, but is fastened to a cross-slide 29, which rests upon ways 30, 30, provided by said bridge, in order that the work head may be moved transversely of the machine.

The bridge 4 is pivotally attached to the machine base at 31, and is adjustably held on the other side by a screw adjustment device 32. Referring to Figs. 3 and 4, this device comprises a bracket 33, fastened to the base and extending upwardly on one side of the bridge, with its upper end between a pair of projecting ears 34, 34. An adjustment screw 35, which passes through the end of the bracket and the ears 34, 34, is provided to permit angular adjustment of the bridge 4 on the machine base. In this manner the angular position of the work head can be regulated to present the axis of the workpiece in a line exactly parallel to the axis of the rotating grinding wheel 5, or to establish a slight angle between these axes in order to grind workpieces having tapered holes. The table 1 provides a long slot 36 at its left-hand end, as best shown in Fig. 6, in order not to interfere with the belt 19 when the wheel is carried to the grinding position.

The pulley 27 is suitably journaled in bearings provided by an arm 27a, and has attached thereto a worm 37 which meshes with a worm wheel 38. The latter is fastened to a shaft 39 journaled in a projecting cylindrical portion 40 provided by a removable front plate 41 attached to the base 20. In order that this mechanism may be readily removed as a unit, the arm 27a is likewise attached to the front plate 41. To the front of the shaft 39 is fastened a crank member 42 having a radial T-slot 43. A block 44 is located in the said slot 43, and said block provides a projecting stud 45 to which a connector 46 may be pivotally fastened, as by means of a nut 47. The block 44 can be adjusted to any position lengthwise of said slot 43 as by means of an adjusting screw 48, thus to vary the radius of the circle described by the stud 45 and consequently to vary the oscillations imparted to the connector 46, it being noted that the block may be so positioned as to locate the stud 45 coaxially with the shaft 39 which results in no motion of the connector 46. The upper end of the connector 46 is pivotally attached by means of a stud 49 to an arm 50, which, as best shown in Fig. 3, is pivotally mounted at 51 to the bridge 4. The arm 50 carries a pivotally mounted pawl 52 which, when said arm is raised, is pressed by devices which it is not necessary to describe herein, against a ratchet wheel 53. Oscillation of the connector 46 and the arm 50 induced by rotation of the shaft 39 imparts oscillation to the pawl 52 and consequently rotates the ratchet 53 intermittently.

The ratchet 53 and a hand wheel 54 are both fastened to a shaft 55, which projects forwardly from the bridge 4 and is suitably journaled therein, as by means of a ball bearing 56 and a plain bearing 57, the latter provided by a portion 58 extending from the side of the bridge 4, as shown in Figs. 3 and 6. Between the bearings 56 and 57 the shaft 55 has fastened thereto a cam member 60 which, as best shown in the fragmentary perspective view of Fig. 5, has a peripheral surface 60a of involute character. Referring again to Fig. 3, the surface of the cam member 60 is engaged by a short contact member 61 that is pivotally mounted at 62 on the long end of a bell crank lever 63. The latter is pivotally fastened to the bridge 4 by means of a stud 64 projecting upwardly from said bridge, and therefore is normally stationary with respect to the machine frame. The short arm 65 of the said bell crank lever 63 engages a pin 66 that depends from the cross slide 29. Since the ratchet wheel 53 and consequently also the cam member 60 are intermittently rotated in a clockwise direction, and since the involute surface 60a of the cam member 60, when rotated in such direction, presents successive elements of the said surface located farther and farther from the axial center thereof (until a shoulder 67 is reached whereupon there is a sudden change from that element farthest from the center to that element nearest the center) it follows that the bell crank lever 63 will be gradually moved in a counterclockwise direction as viewed in Fig. 3, and therefore the depending pin 66 will be urged toward the front of the machine frame, thus moving the cross slide 29 in that direction.

In order that there may be no lost motion in any of the parts, and more especially, in order that the cross-slide 29 may be quickly returned to its initial position at the finish of its forward feed, as signified by the moving of the shoulder 67 past the pivotally mounted contact member 61, spring means is provided to urge the cross slide 29 rearwardly of the machine. As best shown in Figs. 3 and 6, the cross slide 29 provides a depending portion 68 located behind a portion 69 projecting upwardly from the bridge 4. In the depending portion 68 are drilled a plurality of holes 70 in which are located springs 71 that bear against the portion 69, said springs being backed up by plugs 72 which are screwed into screw threaded portions of the holes 70. In this manner an even tension is secured upon the cross-slide 29 at all times, and when the end of the involute surface 60a is reached the cross slide moves quickly back to the starting position that permits the grinding wheel to enter an unground workpiece in the chuck.

Adjustably fastened in any desired angular position to the hand wheel member 54 is a ring 73. This ring may carry the scale markings which are provided by cross feeding instrumentalities for machine tools for convenience in setting the machine, and also, as here shown, it carries a cam projection 74. In the clockwise rotation of the dial ring 73, the cam 74 is adapted to successively engage adjustable screws 75 and 76 located in the path of said cam projection, as best shown in Fig. 1. These adjustment screws 75 and 76 are carried by lever arms 77 and 78, the exact construction of which it is unnecessary to set forth herein, as it forms no part of the present invention.

Figure 8:
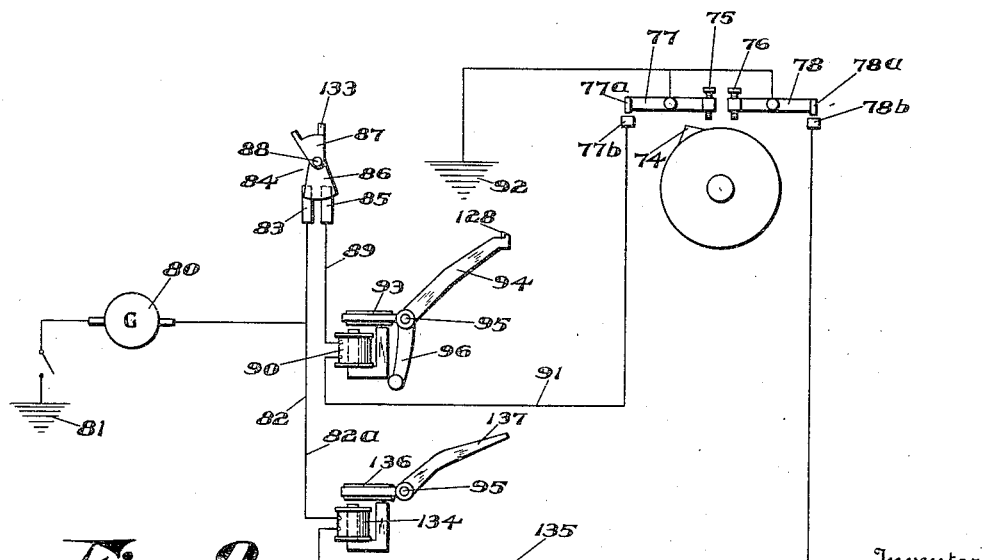
Fig. 8 is a wiring diagram.

Referring now to the wiring diagram of Fig. 8, the lever 77 which is first rocked by engagement of the cam projection 74 with the screw 75, carries a movable contact point 77a which, when the lever is rocked, closes an electric circuit by contact with a stationary contact point 77b. The closing of this electric circuit, as hereinafter described, causes wheel dressing instrumentalities of the machine to be brought into operation. The lever 78 carries a contact terminal 78a which in similar fashion is caused to engage a contact terminal 78b, and this closes another electric circuit, procuring longitudinal separation of the grinding wheel 5 from the workpiece, thus terminating the grinding operation.

The exact manner in which the dressing operation occurs comprises briefly the temporary withdrawal of the grinding wheel 5 from the workpiece, that is to say an amplification of its normal working stroke, and the disposal simultaneously of a wheel dressing member or diamond 79 in the said amplified path, thereby to dress and true the periphery of the wheel 5. As shown by the wiring diagram of Fig. 8, electric current may be supplied by a direct current generator 80 driven continuously by any suitable means, not shown, from the same source of power that is used for the rotation of the grinding wheel or the workpiece, or from any other source. One terminal of this generator 80 is grounded, as shown at 81, and the other is connected by a supply lead 82 to a bar 83 of a switch,—the latter being designated as a whole by the numeral 84 and being disposed, as shown in Fig. 1, on the front of the machine. Said switch 84 provides an additional contact plate or bar 85 which is adapted to be alternately connected and disconnected from the bar 83 by a connector 86, that is mounted on an oscillatory member 87 comprising part of said switch. The oscillatory member 87 is pivoted at 88, and in its normal position, as shown in Fig. 8, disposes the connector 86 in contact with and across the two plates 83 and 85; in the other position of movable member 87 said bars are wholly disconnected.

When the contact plates 83 and 85 are electrically connected, the supply lead 82 from the generator 80 is connected to a lead 89 running from the contact plate or bar 85 to the coil of an electromagnet 90 which, as shown in Fig. 1, is disposed on the front of the machine. A return lead 91 from the coil of the electromagnet 90 connects said electromagnet and the contact terminal 77b. When the circuit is closed at 77a and 77b, as hereinafter described by the action of the cam 74, the electromagnet 90 is energized, since the terminal 77a is grounded, as shown at 92, Fig. 8.

Energization of electromagnet 90 causes attraction of an armature member 93 and the consequent elevation of its attached lever arm 94, these parts being pivoted at 95 on the front of the machine. Integrally attached to the armature 93 and the lever arm 94 is a depending arm 96, which consequently must move when the first two named parts move. In procuring the dressing operation as hereinbefore briefly outlined, the lever arm 94 acts to cause amplification of the path of travel of the grinding wheel 5, and the depending arm 96 causes the dressing point or diamond 79 to be lowered into the path of the wheel.

The dressing device or diamond 79 is desirably mounted in a screw plug 97, carried by an oscillatory member 98 which is mounted in bearings provided by a standard located at the rear of the machine, and it may be accurately adjusted as regards its operative position by means of a knob with scale markings 99, all as set forth in a patent to Guild and Grimshaw, No. 1,655,903, granted January 10, 1928. Such mounting of the dressing point to swing it into the path of the grinding wheel 5, to accurately adjust its position of engagement with said wheel, and to hold it firmly against any pressure which may be exerted upon it, forms no part of the present invention and will be found fully disclosed in the aforesaid Guild and Grimshaw patent. It is sufficient to note that counterclockwise swinging of a lever 100, Fig. 6, which draws rearwardly a link 101 attached to the oscillatory member 98, serves to lower said dressing diamond 79. The fluid pressure generated by the pump 11 is used to move this bell crank lever 100, a branch pipe 102 from said pump leading the fluid to a valve generally designated by the numeral 103. The slidable valve member 104 of said valve is connected at 105 as shown in Fig. 1, to the depending arm 96, and when the said depending arm is moved in a counterclockwise direction by the magnet 90, the valve 104 is moved from the position shown in full lines in Fig. 7 to the dotted line position of said figure. This admits fluid under pressure through ports 106 and 107 to a pipe 108 that connects to a cylinder 109, formed in a block or casting 110 that extends upwardly from the rear of the machine frame. A piston 111 is located in said cylinder 109, and a pin 111a provided by it is in engagement with the bell crank lever 100, and consequently rearward movement of said piston, in response to fluid pressure actuation as described, swings said bell crank lever in a counterclockwise direction to lower the diamond 79 into the path of travel of the wheel 5.

Turning now to the manner in which upward movement of the lever arm 94 causes the normal path of travel of the wheel 5 to be amplified, and referring to Fig. 1, the left-hand table dog 8 which limits the right-hand movement of said table is carried by a block 112 which, instead of being secured directly to the table 1, as in the case of the block 113 of dog 7, is mounted so as to be capable of sliding freely longitudinally of said table. Under normal conditions, when the table 1 is making its usual working reciprocations to traverse the grinding wheel 5 back and forth within the workpiece, the block 112 of dog 8 is held in definite spaced relation to block 114, which latter, the same as the block 113 of right-hand dog 7 is a stationary block adapted to maintain its predetermined setting or adjustment longitudinally of the table 1, as given it by any suitable adjustment or holding device, such as the hand screw nut 115, shown in Fig. 1, applied to block 114, there being a similar device provided by the block 113 which is not shown. Said hand screw nuts engage with a screw rack 116 provided by the table 1.

The device employed to hold the slidable block 112 in spaced relation to the fixed block 114 is here shown as a latch lever 117, pivoted at 118 on the block 114, and having its free end disposed by gravity in abutting relation to a shoulder 119 on the block 112, thereby holding the block 112 at a predetermined distance to the right of the block 114. When the latch member 117 is lifted to free its end from the shoulder 119, the normal connections between the slidable block 112 and the fixed block 114 is broken, and when this occurs on the right hand movement of block 112, the dog 8 will bear without effect against the member 9. Thus the right-hand movement of the table 1 on this particular working stroke will be extended beyond the usual reciprocatory working path, and the grinding wheel 5 will be carried out of the hole in the workpiece to a point just beyond that occupied by the dressing device 79, which is moved into operative position in the path of said wheel 5 as the amplified right-hand travel of the table 1 begins. This amplified right-hand travel of table 1 involves relative sliding movement between said table and the block 112, owing to the obstruction which the reversing member 9 imposes against the dog 8 to prevent block 112 from moving with the table; finally, the block 112 brings up against the block 114, whereupon the solid backing thus afforded for the block 112 enables the dog 8 to shift the member 9. This procures reversal of the direction of travel of the table 1, and the left-hand movement of said table thus inaugurated is caused to restore the parts automatically to normal position in the following manner.

A member 120 pivotally mounted at 121 on the frame of the machine has a pair of inclined surfaces 122 and 123 for co-operation with inclined surfaces 124 and 125 at the lower corners of the block 112. A spring 126 presses said member 120 upwardly. In the normal grinding operation of the machine, when the blocks 112 and 114 are connected by latch 117, the surfaces 122 and 123, although in the path of block 112, offer no effective obstructive to the back and forth travel of said block in unison with the table 1, it being obvious that when either lower corner of the block under these conditions strikes either of the beveled surfaces 122 or 123, such contact will wedge the spring 126 downwardly, said spring yielding sufficiently to allow the block 112 to pass over the member 120. However, when the block 112 has been freed from the block 114 as above described, to amplify a single right-hand stroke of the table 1, the ensuing reversal of said table, with the block 112 still free, finds the surface 122 in position to contact with the corner 124 of said block, and under these conditions, the obstruction offered is sufficient to overcome whatever friction there is to cause the block 112 to move to the left with the table. The block 112 being thus held stationary while the table 1 and block 114 continue to move to the left, the latch member 117 finally resumes its normal position relative to the block 112, the end of said latch member 117 dropping behind the shoulder 119, and the parts being thus automatically restored to normal position at the conclusion of each single amplified reciprocation of the table 1.

Figure 7:
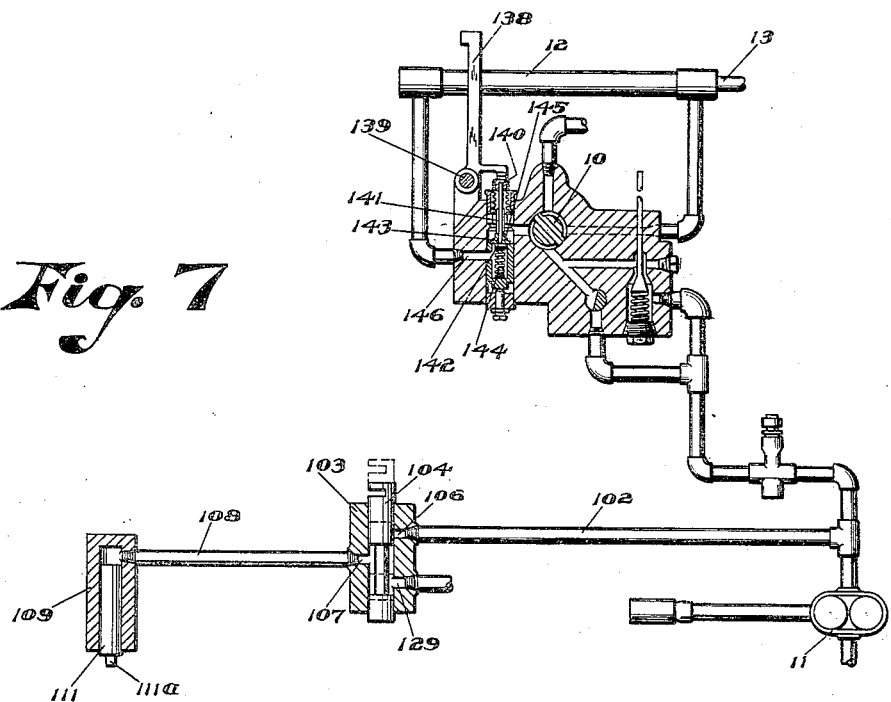
Fig. 7 is a diagrammatic view of the fluid pressure actuating mechanism and connections.

At the end of the amplified stroke of the table 1 to cause the dressing of the wheel 5 as just described, the valve member 104 is automatically placed in its initial position, as shown in full lines in Fig. 7, this operation being brought about by the movement of the table 1. As shown in Fig. 1, the block 112 provides a shoulder 127 which is adapted to contact with a vertical shoulder 128 of the lever arm 94. When the block 112 is in engagement with the block 114 and the dog 8 proceeds to swing over the reversing member 9 as already described, the movement of the table to procure such reversal is just sufficient to cause the shoulder 127 to engage the projecting portion 128 and to swing the parts 93, 94, and 96 in a clockwise direction to their normal position, where they are held by the friction of the valve member 104 in the valve 103, the magnet 90 being then deenergized as will be described. Such return of the valve member 104 to its original position disconnects the port 106 from the port 107, and shuts off the supply of pressure fluid from the cylinder 109, and in fact opens up said cylinder to an exhaust port 129, as clearly shown in Fig. 7. The dressing diamond 79 is not, however, immediately moved to the position shown in Fig. 1, since the mere opening of the cylinder 109 to an exhaust port exerts no force on the oscillatory member 18, but the subsequent return of the table 1 to normal grinding position procures the elevation of said dressing point 79 by means of the engagement of a cam member 130 provided by said table 1 with a roller 131 on the end of the bell crank lever 100, as will be apparent from the views of Figs. 4 and 6.

On the right-hand amplified dressing stroke of the table 1, as just described, an arm 132 pivoted at 118 and hanging by gravity, as shown in Fig. 1, strikes an arm 133 of the movable switch member 87, thereby rocking the connecting bar 86 of said switch member away from the contact bar 85 and thus preventing a repetition of the dressing stroke.

The machine is so set and adjusted that the dressing of the wheel 5, as just described, occurs after the usual rough grinding of the workpiece. By said dressing operation the grinding wheel 5 is made tangent to a known vertical plane, as determined by the position of the dressing device 79 when it is moved into operative position. At the time of the inauguration of this dressing stroke the axis of the workpiece is located at a definite known position relative to the machine frame, depending only on the adjustment of the cam 74 and screw 75, and therefore if a predetermined and known amount of cross feed movement of said workpiece is given thereto subsequent to the dressing operation, and the grinding then terminated, it will be apparent that the workpiece will be brought to a definite known size. The wheel 5 having subsequently returned into the workpiece to finish the grinding operation, the cross feed brought about by rotation of the cam 60 proceeds for an exact predetermined amount as measured by the angular turning of the ratchet 53, the dial ring 73 and the cam member 74, until such time as said cam member engages the adjustment screw 76. The movement of said screw 76, with consequent rocking of the lever 78 to bring the contacts 78a and 78b together, procures the termination of the grinding operation. As the workpiece has been fed an exact predetermined amount since the location of the cutting edge of the grinding wheel 5 in a definite relation to the axis of the workpiece, the said grinding operation is terminated with the workpiece at the exact desired size.

Referring again to the wiring diagram of Fig. 8 a branch 82a from the lead 82 connects to an electromagnet 134, which is located on the front of the machine directly behind the electromagnet 90 and which, since it is desirably of the same form and shape as the other electromagnet, is completely hidden by it in Fig. 1. Said electromagnet 134 is, however, shown in the wiring diagram of Fig. 8. The other terminal of the coil of this electromagnet is connected by a conductor 135 to the contact terminal 78b. From the wiring diagram, without more description, it will be apparent that the electromagnet 134 is energized upon the making of the circuit at the contacts 78a and 78b.

Pivotally mounted on the same pivot shaft 95 that carries the armature member 93, the lever arm 94, and the depending arm 96, is an armature member 136 and an inclined lever arm 137, desirably formed in a single piece. The inclined lever arm 137 is in the path of travel of the table dog 8, which is pivotally attached to its carrying block 112. When the lever arm 137, the end of which is shown in Fig. 1, is raised by the energization of the magnet 134 and consequent attraction of the armature member 136, the reversing dog 8, by reason of its pivotal mounting, is free to ride on the upper surface of said lever arm; thus the striking end of said dog 8 is carried clear of the reversing member 9, and the table 1 continues its movement to the right carrying the grinding wheel 5 out of the workpiece and well past the then inoperative dressing device 79, said table ultimately carrying the grinding wheel 5 into the position illustrated in Fig. 1, and there being brought to a full stop by any suitable means, such as that shown in the aforesaid patent to Heald and Guild.

Referring to Fig. 7, such stoppage of the table 1 is herein illustrated as being brought about by the striking of a pin, not shown, carried by the table 1 against a lever 138. Said lever 138 is pivotally mounted at 139 and one end of said lever engages a cap 140 which is spring pressed upwardly, and which is mounted on the top of a rod 141. The rod 141 terminates in a head 142 below a poppet valve 143, the latter being pressed upwardly by a heavy coil spring 144. The spring 144 holds the poppet valve 143 away from its seat 145, and consequently normally allows the fluid to flow through a port 146 to the left-hand end of the cylinder 12, but when, by striking of the pin against the lever 138 the rod 141 is depressed, thus compressing the spring 144, the valve 143 is closed by the pressure of the fluid, and this brings the table 1 to a stop.

In order to bring the chuck 6 to a stop coincident with cessation of grinding as just described and what is more important in order to prevent the undue actuation of the cross-feed mechanism, means is provided to stop the rotation of the pulley 18 in response to the above-described final separation of the grinding wheel and workpiece. This is necessary because long-continued rotation of the cam member 60 would be not only useless but harmful, for one of the principle objects of the present invention is to do away with the necessity for adjustment of the cross feeding mechanism by the operator, and if the cam 60 continued to turn, the operator would have to ascertain what position the cross feed had reached, prior to his inauguration of the grinding operation on another workpiece, as otherwise the machine might carry the front face of grinding wheel 5 against the end of said unground workpiece, and shatter the wheel or cause other damage. To that end the motor shaft 15, to which the driving member of the clutch 16 is fastened, slidably supports the pulley 18, a collar 147 being provided which has trunnion projections 148, 148, that are engaged by a yoke 149 pivotally mounted at 150 on the rear of the machine. The yoke 149 is formed on one end of a bell crank lever 151, the other end of which is connected by a toggle connection 152 to a lever 153, pivotally mounted at 154 on the back of the machine. The lever 153 is in turn connected by means of a link 155 to a bell crank lever 156, pivotally mounted at 157 on the bridge 4. On the free end of the bell crank lever 156 is a roller 158 which is of a size to fit in a cam slot 159 provided by a cam member 160 attached to the back of the table 1. When the table 1 is reciprocating in that position where the grinding wheel 5 is traversing across the face of a workpiece, the roller 158 is located in that portion 159a of the cam slot 159 which causes the utmost depression of the free end of said bell crank lever and which, therefore, as may be discerned from a study of the lever connections described, causes the clutch 16 to be in the engaged position. When, however, the table 1 withdraws in the manner above described, the roller 158 is forced upwardly as by the portion 159b of the track cam 159 and this opens the clutch, thus stopping the rotation of the chuck and causing cessation of the actuation of the cross feed mechanism. The cam member 160 is adjustable on the back of the table 1 and should be placed in such a position that the chuck drive will not be stopped until the wheel 5 is well out of the workpiece thus allowing the rotation of the cross-feed mechanism to continue until the shoulder 67 has dropped below the contact member 61.

The cyclic motion of the cross-feeding mechanism of my invention greatly simplifies the setting and handling of the grinding machine into which it is incorporated, because the operator never has to manually reposition the cross-slide 29, and thus much time which would otherwise be wasted between grinding operations is saved. The use of such mechanism, and the incorporation in the present machine of the principle of operation set forth in U. S. Letters Patent to Guild, No. 1,682,672, granted August 28, 1928, necessitates the provision of an additional feeding mechanism, periodically operated, in order to compensate the machine for the gradual reduction in size of the grinding wheel occasioned by normal and inevitable wear, and also by the dressing and truing which it must undergo in order to fix its cutting surface at a predetermined and fixed line, for the attainment of accuracy and uniformity in the grinding of successive workpieces. Such additional feeding mechanism also serves, as hereinbefore pointed out, to permit the machine of the invention to grind different sized workpieces, without the necessity of providing a great number of different sized cams 60.

Referring now to Figs. 1 and 2, the wheel head 2 is not carried directly by the table 1, but is carried by an interposed cross-slide 2a, which is mounted on cross-slide ways 161 which may be similar to the ways provided for the movement of the cross slide 29. A screw shaft 162, to which is attached a hand wheel 163 is provided to move said cross-slide transversely of the table 1, there being a nut, not shown, depending from the cross-slide 2a through which said screw shaft passes, and with which it co-operates to give the cross-slide a feeding movement in a manner which is well known in this art. Suitably fastened to the screw shaft 162 or the hand wheel 163 is a ratchet wheel 164, which is shown in Fig. 2;—movement of the table 1 to the position shown in Fig. 1 at the termination of a grinding operation, as already described, causes a pawl 165 to move said ratchet wheel 164 through a limited distance, thus causing movement of the cross-slide 2a on the ways 161 by a predetermined amount. As shown in Fig. 2, the pawl 165 is pivotally mounted at 167 on an arm 168 which is in turn pivotally mounted on the shaft 162. A stop pin 169 is provided to normally locate the arm 168 in the position shown in Fig. 2, a spring 170 holding it in this position, said spring extending between a stationary pin 171 and a pin 172 projecting from the hub of the lever arm 168. Pivotally mounted at 173 on the arm 168 is an arm 174 which normally hangs downwardly in the position shown in Fig. 1, said arm 174 being entirely free on the arm 168 except when, as shown in Fig. 2, said arm 174 engages a stop lug 175 projecting from the hub of the arm 168. Such engagement is brought about by travel of the table 1 to the position shown in Fig. 1, and on its said outward movement, the arm 174 is rocked to the position shown in Fig. 2 by means of an inclined cam 176. When the parts have reached the position shown in Fig. 2 no further movement of the arm 174 can take place without swinging the arm 168 on its pivot 162;—such movement does take place and moves the pawl 165 through a limited distance, said pawl being caused to engage the teeth of the ratchet wheel 164 by cam devices which are very familiar to those skilled in this art and need not be herein described. This action procures limited turning of the screw shaft 162, but it should be noted that the subsequent return of the table 1 to its operative position has no effect on the said screw shaft, since the depending arm 174 can swing to any extent to the right on its pivot 173.

In order to adjust the machine for the grinding of workpieces to a given size, the operator, with the machine parts in the position illustrated in Fig. 1, places an unground workpiece in the chuck 6, adjusts the stud 45 coaxially with the shaft 39, thus preventing automatic operation of the cam 60, and, having turned the hand wheel 54 to that position where the contact terminals 78a and 78b have just been brought together by the action of the cam 74, proceeds to operate the machine by hand control, for grinding the workpiece to size, in the well known manner. To that end the operator causes the table 1 to carry the wheel 5 into the workpiece by the movement of a control lever 177 provided on the front of the machine and connected to the reversing valve, the pivotally mounted dog 8 lifting over the reversing member 9 and thus establishing the reciprocatory travel of the table 1 within the limits determined by the adjustable dogs 7 and 8. The operator procures the lateral feed between wheel and workpiece for this non-automatic grinding of the first workpiece by turning the hand wheel 163, the work being brought to the exact desired size by the use of plug gages or in any other desired manner. With the cross-slide 2a thus brought to that position where subsequent automatic movement of the other cross-slide to the position in which it has been manually set, during this preliminary operation, will inevitably cause a workpiece to be brought to the same size as the trial workpiece, the locus of the cutting edge of the wheel 5 is fixed in this position of adjustment in the following manner.

The table 1 is caused to withdraw the grinding wheel 5 from the workpiece as by manual lifting of the table dog 8, and the table 1 is stopped as by the use of the hand lever 177 in such a position that the grinding wheel 5 is directly in front of the dressing device 79. The latter may now be manually moved downwardly by means of a hand lever 178 until it is apparent whether it will touch the grinding wheel 5 or not. The stand which holds the dressing diamond 79 and the oscillating member to which it is secured should then be moved rearwardly in a manner which will be found described in the patent to Guild and Grimshaw referred to so that the diamond 79 will not touch the wheel 5; the diamond having been placed in its lowermost position is caused to approach the wheel by the use first of the coarse feeding means described in said patent, and ultimately by the knob 99, which procures a fine feed, until said diamond barely touches the wheel 5. The table 1 should now be caused to withdraw to its original position of Fig. 1, during which withdrawal the cross-slide 2a will be advanced by a slight amount as already set forth, and the machine is now ready for the grinding of any number of workpieces to the exact size that the first workpiece was ground, so long as the grinding wheel 5 lasts.

In the automatic grinding of such workpieces the cross-feed between the work and the wheel is procured by the rotation of the cam 60; the grinding is interrupted when the contacts 77a and 77b are brought together and the grinding wheel 5 is dressed and trued to bring its cutting edge to the known position as hereinbefore explained; the grinding is then resumed until the cross-slide 29 has been moved to that position at which it was located in the grinding of the trial workpiece. If all setting operations have been accurately performed it is inevitable that the workpieces automatically ground will be brought to the same size, but even if they have not the machine can be further adjusted to a sufficient extent to overcome any error by means of the adjustment screw 76 or by movement of the dressing diamond through the medium of the knob 99.

The cam 60 can be so shaped that the grinding which occurs prior to the dressing operation will take place at one rate of cross-feed and the grinding which takes place after the dressing operation will occur at a different and lesser rate of cross-feed. It is desirable that the cam should be thus formed, and in fact the dressing operation should take place when the cross-slide 29 is but a few thousandths of an inch removed from the ultimate position it will have at the finish of a grinding operation, in order that wear on the grinding wheel 5 between rough grinding and finished grinding may be a negligible factor. In respect to these matters, the particular cross-feeding mechanism of the present invention presents several advantages over prior cross-feed mechanisms because although the rotation of the cam may take place at a constant rate, the cam can be formed not only to differentiate between the grinding prior to dressing and the grinding after dressing, as already set forth, but also the cam 60 can have a dwell at any desired point for the purpose, for example, of relieving the side pressure on the wheel spindle 5a. This is very desirable in some classes of work where the utmost accuracy in the bore of a workpiece is essential and where any "bell-mounting" is fatal. For other classes of work a cam 60 may be used which will build up the pressure between the grinding wheel and the workpiece to a predetermined known amount, if quantity production is the desired end. If the wheel pressure is maintained at a known amount, substantial accuracy in the grinding of workpieces may be maintained even in spite of the rapidity of production.

It will be apparent to all those familiar with this class of machine that many variations may be made in the exact details of construction and mode of operation of the machine without departing from the spirit of the invention. For example, the lever 78 and adjustment screw 76 could be omitted altogether and the contacts 78a and 78b brought together by the repositioning movement of the cross-slide 29 when the cam 60 has moved to carry the shoulder 67 just beyond the contact piece 61, and such a construction would present many advantages. No adjustment would ever then be possible for the final position of the cross-slide 29 so long as the same cam 60 were used, but the construction would have the advantage of never getting out of adjustment, and by the adjustment of the other cross-slide and the position of the diamond 79 as hereinbefore described, workpieces of any size within large limits could be accurately ground.

I claim:

1. In a grinding machine, the combination with cam means for advancing and retracting a work head in relation to a grinding wheel to produce a cutting feed therebetween and replacement to a position of no feed to allow the entry of a grinding wheel into a fresh workpiece, of means for causing said wheel to withdraw from a workpiece just prior to the movement of said parts to the position of maximum feed, and means to cause said cam means to continue feeding after said withdrawal just long enough to cause the retraction of said parts in relation to each other.

2. In a grinding machine, the combination with cam means for advancing and retracting a workhead in relation to a grinding wheel to produce a cutting feed therebetween and replacement to a position of no feed to allow the entry of a grinding wheel into a fresh workpiece, and resilient means acting on said workpiece opposing said cam means, of separate independent mechanical means for drawing said grinding wheel away from said workpiece at a predetermined angular position of said cam means.

3. In a grinding machine, the combination with cam means for advancing and retracting a workhead in relation to a grinding wheel to produce a cutting feed therebetween and replacement to a position of no feed to allow the entry of a grinding wheel into a fresh workpiece, and resilient means acting on said workpiece opposing said cam means, of separate independent means for drawing said grinding wheel away from said workhead to cause cessation of a grinding operation, and a control actuated synchronously with said cam means for setting said last named means in operation.

4. In a grinding machine, the combination with cam means for advancing and retracting a workhead in relation to a grinding wheel to produce a cutting feed therebetween and replacement to a position of no feed to allow the entry of a grinding wheel into a fresh workpiece, and resilient means acting on said workpiece opposing said cam means, of separate independent means for drawing said grinding wheel away from said workhead to cause cessation of a grinding operation, a control actuated synchronously with said cam means for setting said last named means in operation, and means for continuing the rotation of said cam means after the separation to allow the grinding wheel to enter a fresh workpiece.

ROGER N. HEALD.